United States Patent
Fleury

[15] 3,680,882
[45] Aug. 1, 1972

[54] SNOWMOBILE PROTECTIVE DEVICE

[72] Inventor: Camille Fleury, 198 Rue Adam, Richmond, Quebec, Canada

[22] Filed: March 23, 1970

[21] Appl. No.: 21,620

[30] Foreign Application Priority Data

Feb. 27, 1970 Canada..........................076,144

[52] U.S. Cl. ..............................280/150 R, 180/5 R
[51] Int. Cl. ............................................B60r 19/00
[58] Field of Search .......................280/150 R, 150 C

[56] References Cited

UNITED STATES PATENTS 3,552,514  1/1971  Alpers......................280/150 C
1,122,742  12/1914  Halbach....................280/150 R Primary Examiner—Benjamin Hersh
Assistant Examiner—Robert R. Song
Attorney—Alan Swabey

[57] ABSTRACT

A safety device for power sleds including a front crash frame projecting upward around the sides of the windshield and having a pair of cutters mounted on opposite sides of the vehicle and adjacent the top of the frame, the vehicle further including a back rest mounted on a frame so that it may be moved from an elevated to a lower position and a canopy adapted to extend between the back rest and the top of the front frame member.

2 Claims, 5 Drawing Figures

PATENTED AUG 1 1972 3,680,882
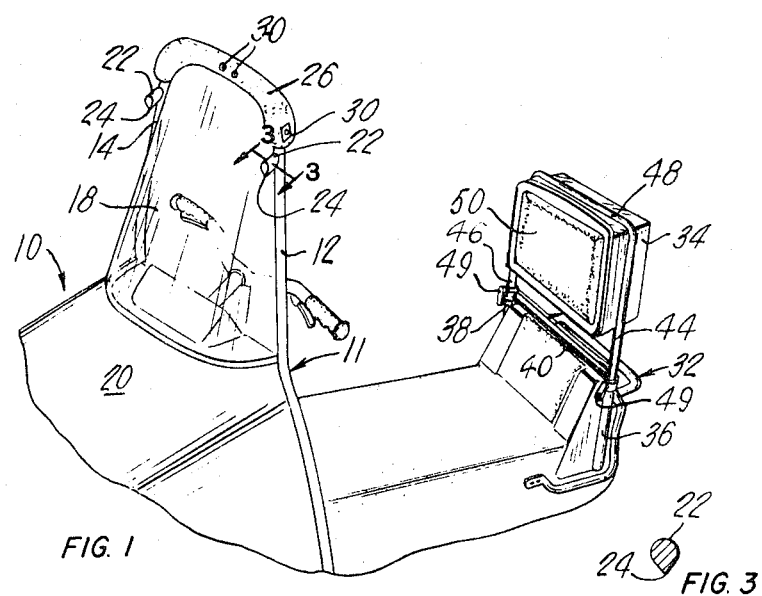
FIG. 1
FIG. 3
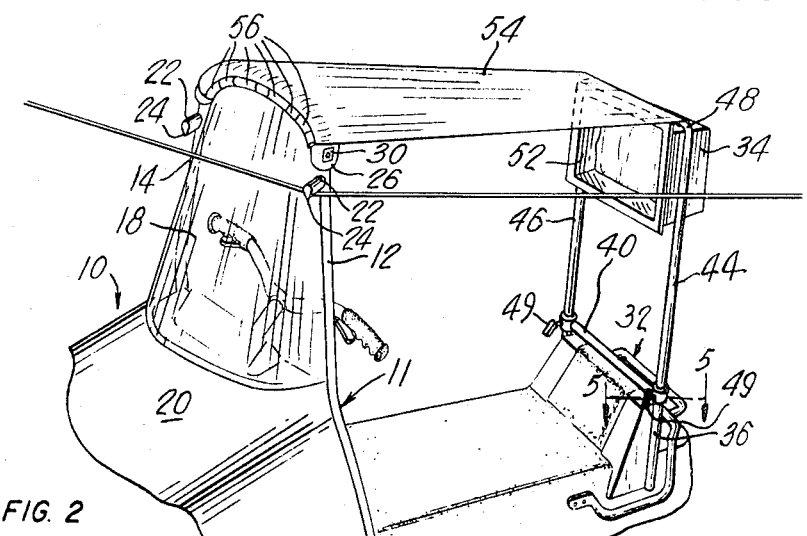
FIG. 2
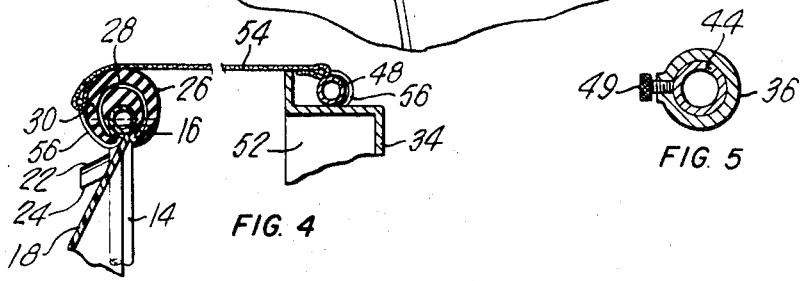
FIG. 4
FIG. 5
INVENTOR
Camille FLEURY
Alan Swabey
ATTORNEY

3,680,882

SNOWMOBILE PROTECTIVE DEVICE

BACKGROUND OF THE INVENTION

1. Field of the Invention

The present invention relates to snowmobiles or power sleds. More particularly, the present invention relates to a protective arrangement to prevent a driver from being hit by wires strung across his path.

2. Description of Prior Art

Snowmobiles or power sleds have become more and more popular in recent years and the number of fatal or near fatal accidents attributed on such vehicles has increased steadily. One of the main causes of such accidents is low hanging wires, for example, fence wires which the snowmobiler does not see (particularly in the dark) and which catches him under the chin, lifting him from the vehicle and severely wounding him and in many cases resulting in fatalities.

Other accidents that sometimes occur are occasioned by a rider tumbling off the back of the vehicle and being hurt.

SUMMARY OF INVENTION

It is the main object of the present invention to improve the driving safety of power sled vehicles.

Broadly, the present invention relates to a windshield frame for a power driven sled vehicle, said frame having a pair of side bars projecting up above the vehicle on opposite sides thereof and having a bridging member interconnecting the upper ends of the side bars, there being a pair of downwardly opening, forwardly projecting cutters, one positioned adjacent the top of each of said bars, said cutters having a downwardly facing cutting edge.

BRIEF DESCRIPTION OF THE DRAWINGS

Further features, objects and advantages of the present invention will be evident from the following detailed description of a preferred embodiment of the present invention when taken in conjunction with the accompanying drawings in which:

FIG. 1 is a partial perspective view of a power sled vehicle incorporating the present invention;

FIG. 2 is a view similar to FIG. 1 but showing a canopy in position over the vehicle;

FIG. 3 is a section along the line 3—3 of FIG. 1;

FIG. 4 is a section through the canopy mounting means illustrating the padding arrangement on the front frame; and FIG. 5 is a section illustrating the telescopic arrangement of the rear frame.

DESCRIPTION OF PREFERRED EMBODIMENTS

In the illustrated arrangement, a conventional motorized sled or the like 10 is provided with a front frame 11 formed by a pair of side bars 12 and 14 anchored to the frame of the machine 10 in any suitable manner. The top ends of the bars 12 and 14 are interconnected by an upper bridging member 16 (see FIG. 4). A suitable windscreen 18 is received between the side bars 12 and 14, the bridging member 16 and the front cowling 20 of the vehicle 10.

The side bars 12 and 14 locate the bridging member 16 above the head of the vehicle driver. One of the key elements of the present invention is the forwardly projecting cutters 22, one of which is positioned adjacent the top of each of the bars 12 and 14. These downwardly opening, forwardly projecting cutters 22 each have a sharpened downwardly facing cutting edge 24 which is sufficiently sharp to cut a wire when impacted by the machine and yet not sharp enough to provide a hazzard to the people using the vehicle. It is important that there be at least two such cutters, one on each side of the vehicle near the top of the frame 11 formed by the bars 12 and 14 and member 16. Preferably, these cutters 22 will be on the side bars 12 and 14 at or adjacent the top of these bars. If desired, a third cutter may be provided projecting forwardly and opening downwardly from about the center of the bridging member 16 or any other number of cutters 22 may be provided, bearing in mind that it is essential to have at least two such cutters on each side of the vehicle and positioned adjacent the top of the frame 11.

The bridging member 16 will preferably be padded with a crash padding 26 which is wrapped therearound as shown in FIGS. 1, 2 or 4. This crash padding 26 may be held in position by suitable C-shaped resilient clips 28 embedded therein and/or by suitable bolts 30 or the like extending therethrough (see FIG. 4). The padding 26 reduces injuries that may be sustained should the vehicle stop suddenly and the rider be thrown against the front frame 11.

Preferably, the vehicle 10 will also be provided with a rear frame 32 on which is mounted a back rest and luggage compartment 34. The back rest which functions as a luggage compartment and crash bar may be positioned at various locations above the rear end of the vehicle.

As shown, the rear frame 32 comprises a pair of side members 36 and 38 rigidly connected to the frame of the vehicle 10 and interconnected by a tubular cross frame member 40. These side frame members 36 and 38 telescopically receive a pair of tubular side members 44 and 46 which are secured to opposite sides of the back rest 34 and preferably are interconnected by an interconnecting section 48 which in the illustrated arrangement is a tubular member directly above the back rest 34.

The back rest 34 may be moved between its lowered position shown in FIG. 1 and its elevated position shown in FIG. 3 by sliding the members 44 and 46 within the members 36 and 38. Suitable locking means such as bolt 49 threaded through the members 36 or 38 into frictional engagement or into suitable apertures and the members 44 and 46 are provided for locking the rest 34 in its desired position. The bolts 49 may be provided for convenience with suitable lever handle means if desired.

The front padding cushion member 50 of the back rest 34 may be mounted on the rest 34 in such a manner as to be movable to an open position permitting access to the interior of the rest 34 which thereby provides a storage compartment as indicated at 52 in FIGS. 2 and 4.

It is sometimes desirable to provide the motorized sleigh with a canopy 54. The canopy 54 may be stored in the compartment 52 when not in use. When used, the canopy is strung across between the bridging member 16 and the interconnecting section 48. Suitable hooks 56 attached to the canopy at opposite ends thereof are adapted to embrace the members 16 and 48. Stretching of the canopy 54 between these members 16 and 48 provides a sufficiently strong resilient force to hold the canopy in position and yet to permit the canopy to become freed from the vehicle when sufficient pressure is applied, thereby ensuring that no one is trapped on the vehicle should it, for example, break through ice.

In the illustrated arrangement, the canopy has been shown extending across the top of the vehicle only. If desired, it may be extended down along the sides to form a complete enclosure for the vehicle and thereby provide a convenient storage arrangement.

Modifications may be made without departing from the spirit of the invention as defined in the appended claims.

I claim:

1. A safety device adapted for use on power sleigh vehicles having a windscreen in front of the driver position comprising a front frame formed from a pair of side bars extending upwardly on opposite sides of said vehicle and rigidly connected to said vehicle, a bridging member interconnecting the top ends of said side bars above said windscreen, two forwardly projecting cutters each of which is rigidly secured on the uppermost portion of a respective one of said side bars, each of said cutters having a downwardly facing cutting edge extending forwardly from its respective side bar to cut a wire when impacted by said power sleigh and guided up said side bar to said cutting edge.

2. A device as defined in claim 1, wherein said bridging member is padded.

* * * * *